G. L. HARRISON.
COOKING UTENSIL.
APPLICATION FILED SEPT. 18, 1915.
1,330,868. Patented Feb. 17, 1920.
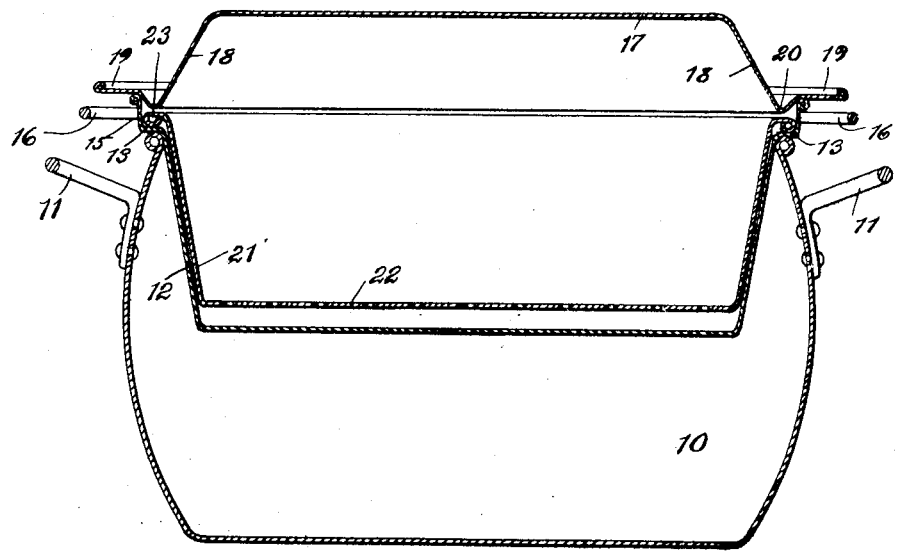
Fig. 1
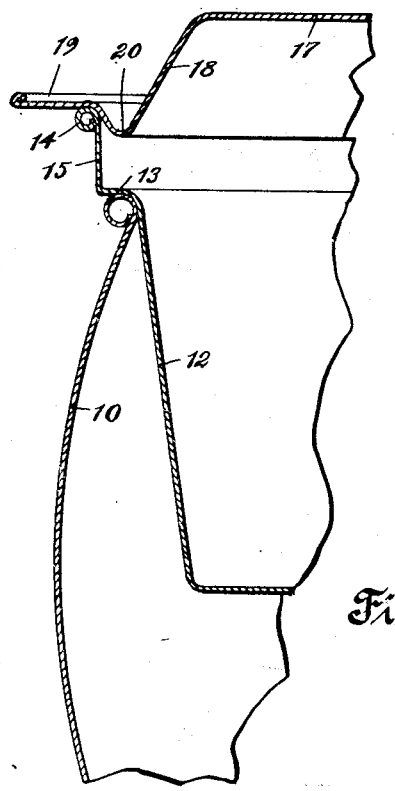
Fig. 2
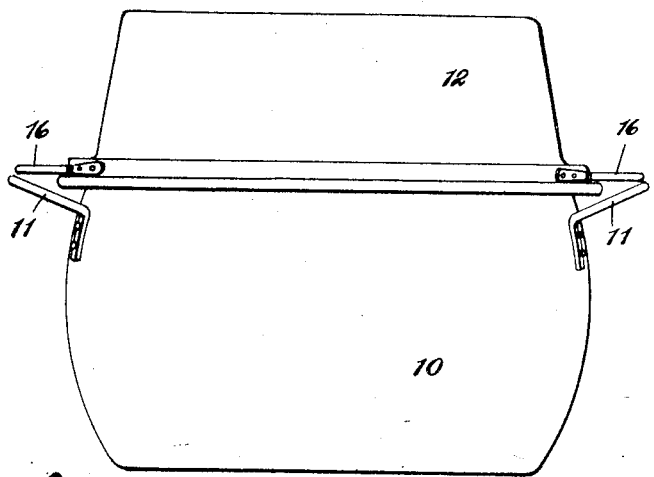
Fig. 3
Fig. 4
Geo. L. Harrison Inventor
By Hull Smith Brock + West
attys.

UNITED STATES PATENT OFFICE.

GEORGE L. HARRISON, OF EAST CLEVELAND, OHIO, ASSIGNOR TO THE CLEVELAND METAL PRODUCTS COMPANY, OF CLEVELAND, OHIO, A CORPORATION OF OHIO.

COOKING UTENSIL.

1,330,868.  Specification of Letters Patent.  Patented Feb. 17, 1920.

Application filed September 18, 1915. Serial No. 51,300.

*To all whom it may concern:*

Be it known that I, GEORGE L. HARRISON, a citizen of the United States, residing at East Cleveland, in the county of Cuyahoga and State of Ohio, have invented a certain new and useful Improvement in Cooking Utensils, of which the following is a full, clear, and exact description, reference being had to the accompanying drawings.

This invention relates generally to cooking utensils and more particularly to a combination utensil, the object being to provide a minimum number of elements so constructed as to be capable of a maximum number of combinations, and also constructing each element in such a manner, as to be capable of certain beneficial operative results when variously combined.

With these objects in view, and certain others which will become apparent as the description proceeds, my invention may be described as consisting in the novel features of construction, combination and arrangement, all of which will be fully described hereinafter and pointed out in the appended claims.

In the drawings forming a part of this specification, Figure 1 is a sectional view of my complete combination; Fig. 2 is a detail sectional view illustrating a different arrangement; Fig. 3 is an elevation illustrating another arrangement; and Fig. 4 is a detail sectional view of the parts shown in Fig. 3.

In carrying my inventive idea into effect I employ a receptacle 10, which may be designated the base or main member, and is preferably made with curved sides and a beaded top edge, and handles 11 are connected to this receptacle near the top, said handles preferably extending upwardly and outwardly as shown. By making the vessel with curved sides the opening at the top is considerably less in diameter than the central diameter of the vessel and the advantage of this construction is apparent, as it provides ample space between the sides of the combining vessels. The receptacle 10 is usually termed a sauce pot.

In connection with this base receptacle or vessel 10, I employ a straight sided pan 12, having an outwardly extending annular shoulder 13 near its top or upper end, and between this shoulder 13 and beaded edge 14 the sides are made perpendicular as at 15 instead of inclined as the sides below the shoulder. Outwardly extending handles 16 are attached to the perpendicular portion 15, and extend in a horizontal direction instead of inclined.

The pan 12 is of such size that the body portion thereof will fit into the vessel 10, as shown in Figs. 1 and 2, and the shoulder 13 rests upon the beaded top of vessel 10 and supports the pan therein, and when so arranged the vessel 10 and pan 12 can be used in various ways.

In connection with the vessel 10 and pan 12 supported therein as described, is a cover 17 which serves the double purpose of a cover and a pie-plate; and this element 17 is formed with a flat bottom, inclined sides 18, the outwardly projecting horizontal flange 19 and the annular corrugation or crimp 20 between the inclined side and horizontal flange; and this annular corrugation is so positioned that it will engage the inner edge of the pan 12 and bring the entire inclined side 18 within the diameter of said pan as most clearly shown in Fig. 2 so that during the cooking operations the condensation which usually takes place upon the cover will travel down the inclined sides 18 and be caught in the pan 12 instead of accumulating around the outer edges. The cover 17 is designed to fit, when inverted in the top of the vessel 10, so that it can be used in connection with said vessel without the use of intermediate pan 12.

In Fig. 1, I have shown a colander 21 with the usual perforated bottom 22, said colander having a beaded upper edge 23 which is adapted to rest upon the annular shoulder 13 of the pan 12, and it will be noted that there is ample space between this shoulder 13 and the corrugation 20 to receive this bead 23, and by the employment of this colander in connection with the pan 12 any material boiled within the pan can be easily removed and simultaneously strained of the boiling liquid by simply removing the colander from the pan. This colander can also be used as a steamer cooker in connection with the vessel 10 and cover 17, omitting the pan 12.

In Fig. 3, I have illustrated the manner of using the vessel 10 and pan 12 to provide a roaster, the pan 12 being inverted and placed upon the top of the vessel 10, the shoulder 13 resting upon the beaded edge of the top. The flange portion 15 embraces this beaded top and maintains the pan 12 in its proper position, and it will be noted that the straight handles of the pan 12 approach but do not contact with the oblique handles of the vessel 10 but being in such close proximity the pair of handles can be grasped and the combined article readily lifted when desired.

From the above description, it will be seen that all of the various elements of my combination device are so constructed as to combine readily one with the other and that the features of construction which permit this combination also provide for the accomplishment of the beneficial results hereinbefore made clear.

Having thus described my invention, what I claim is:—

1. A combination utensil comprising a vessel, a pan having its upper end expanded and shouldered, a cover having inclined sides, an annular corrugation and a straight flange, said corrugation being adapted to rest within the expanded end of the pan, and a colander adapted to rest upon the shoulder of the pan, and beneath the corrugation of the cover as set forth.

2. In a utensil, a vessel having upwardly inclined handles adjacent its upper end, and a pan having an expanded and shouldered upper end, said expanded portion being adapted to fit over the upper end of vessel when said pan is inverted and the shoulder to rest upon the upper edge of the vessel when the pan is inverted over or inserted into the vessel, said expanded portion having horizontal handles adapted to rest adjacent the handles of vessel when said pan is arranged upon or within said vessel.

In testimony whereof, I hereunto affix my signature in the presence of two witnesses.

GEORGE L. HARRISON.

Witnesses:
 W. E. SHEPPARD,
 L. S. CHADWICK.